(12) United States Patent
Curtin

(10) Patent No.: US 8,240,503 B2
(45) Date of Patent: Aug. 14, 2012

(54) PRODUCE KEEPER

(75) Inventor: Heather Curtin, Renton, WA (US)

(73) Assignee: Progressive International Corporation, Kent, WA (US)

( * ) Notice: Subject to any disclaimer, the term of this patent is extended or adjusted under 35 U.S.C. 154(b) by 1091 days.

(21) Appl. No.: 11/848,611

(22) Filed: Aug. 31, 2007

(65) Prior Publication Data

US 2008/0054003 A1 Mar. 6, 2008

Related U.S. Application Data

(60) Provisional application No. 60/824,230, filed on Aug. 31, 2006.

(51) Int. Cl.
*B65D 1/34* (2006.01)

(52) U.S. Cl. ........ 220/571; 220/531; 220/533; 220/501; 99/473

(58) Field of Classification Search .................. 220/571, 220/572, 529, 531, 532, 533, 501, 502; 99/467, 99/473, 474
See application file for complete search history.

(56) References Cited

U.S. PATENT DOCUMENTS

| | | | |
|---|---|---|---|
| 1,126,258 A | 1/1915 | Meyers | |
| 1,580,440 A * | 4/1926 | Palley | ........................... 206/550 |
| 2,160,998 A | 6/1939 | Wilson | |
| 2,176,955 A | 10/1939 | Clow | |
| 3,127,011 A | 3/1964 | Weddle | |
| 3,362,566 A * | 1/1968 | Hanania | ........................ 220/231 |
| 3,627,393 A | 12/1971 | Hickson et al. | |
| 3,692,204 A * | 9/1972 | Provi et al. | .................... 220/4.29 |
| 3,920,144 A * | 11/1975 | Callen | .......................... 220/533 |
| 3,958,715 A * | 5/1976 | Capelli | ......................... 220/532 |
| 4,065,877 A | 1/1978 | Kelley | |
| 4,071,064 A | 1/1978 | Saul | |
| 4,075,786 A | 2/1978 | van Zyl | |
| 4,118,889 A | 10/1978 | Lamlee | |
| 4,118,890 A | 10/1978 | Shore | |
| 4,396,121 A * | 8/1983 | Lemmon | ....................... 206/566 |
| 5,189,947 A * | 3/1993 | Yim | ............................... 99/415 |
| D337,697 S | 7/1993 | Giugiaro | |
| 5,403,634 A | 4/1995 | Mauffette | |
| 5,412,907 A | 5/1995 | Anderson | |
| 5,499,473 A * | 3/1996 | Ramberg | ........................... 43/55 |
| 5,575,848 A * | 11/1996 | Chedville | ......................... 118/13 |
| 5,706,974 A * | 1/1998 | Murdick et al. | ............... 220/735 |
| 6,013,524 A | 1/2000 | Friars et al. | |
| 6,135,307 A * | 10/2000 | Fahy | ............................. 220/574 |
| 6,276,555 B1 * | 8/2001 | Edwards | ....................... 220/572 |
| 6,367,651 B2 * | 4/2002 | Laib et al. | ...................... 220/676 |
| 6,378,325 B1 * | 4/2002 | Yang | ............................ 62/457.6 |

(Continued)

FOREIGN PATENT DOCUMENTS

DE 20318471 3/2004

(Continued)

*Primary Examiner* — Anthony Stashick
*Assistant Examiner* — Christopher McKinley
(74) *Attorney, Agent, or Firm* — Lowe Graham Jones PLLC

(57) ABSTRACT

A fresh produce keeper includes a vessel having a floor and upwardly extending sidewalls. Holes in the floor allow the vessel to be used as a colander or strainer to rinse produce, while a lid fits over the floor to retain water within the vessel, thereby allowing the same vessel to be used for both rinsing and service or storage. An internal divider and air vent is also provided in some examples of the invention.

14 Claims, 4 Drawing Sheets

U.S. PATENT DOCUMENTS

| | | |
|---|---|---|
| D467,131 S | 12/2002 | Wright et al. |
| 6,672,002 B1 | 1/2004 | Gumpper |
| 6,783,018 B1 * | 8/2004 | Rondeau .................... 220/254.3 |
| 6,913,386 B2 * | 7/2005 | Maher et al. .................... 383/38 |
| 6,968,948 B2 | 11/2005 | Scott |
| 7,340,995 B2 * | 3/2008 | Chiang et al. ................... 99/467 |
| 7,487,881 B2 * | 2/2009 | Watzke et al. ................ 220/501 |
| 7,721,362 B2 * | 5/2010 | Martin et al. .................... 4/514 |
| 2001/0035364 A1 | 11/2001 | Weder et al. |
| 2004/0035867 A1 | 2/2004 | Schultz et al. |
| 2005/0056158 A1 * | 3/2005 | Chiang et al. .................. 99/467 |

FOREIGN PATENT DOCUMENTS

WO            2005016013            2/2005

* cited by examiner

PRODUCE KEEPER

PRIORITY CLAIM

This application claims priority to provisional patent application 60/824,230 filed on Aug. 31, 2006, the text of which is incorporated by reference.

FIELD OF THE INVENTION

This invention relates generally to containers for storing produce.

BACKGROUND OF THE INVENTION

Fresh produce requires particular attention in order to preserve its freshness as long as possible. Airflow and moisture are especially important. While a fruit or vegetable is whole prior to peeling, chopping, or the like, it is easily stored in a produce drawer of a refrigerator. After the produce has been peeled or cut it generally must be stored in a container. The typical container is sealed and does not provide the proper moisture and airflow needed to maintain the freshness of the produce.

Produce must also generally be washed in order to remove soil and pesticide residues. Often a person will eat only a small amount of produce at a time. It is inconvenient to wash a small amount every time one wants to eat fresh produce. However, one cannot simply wash produce and return it to the produce drawer of a refrigerator where it will get other produce wet and pick up soil and pesticide residue from other produce. Washed produce also cannot be placed in a sealed container where the water remaining in direct contact with the produce will not be allowed to evaporate and thereby promote mold and bacteria growth.

Although produce is healthy, the processing and storage requirements make it less convenient for snacking than much less healthy processed foods. It would therefore be an advancement in the art to provide a convenient system for storing washed or cut produce for ready access while still controlling moisture and air flow.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
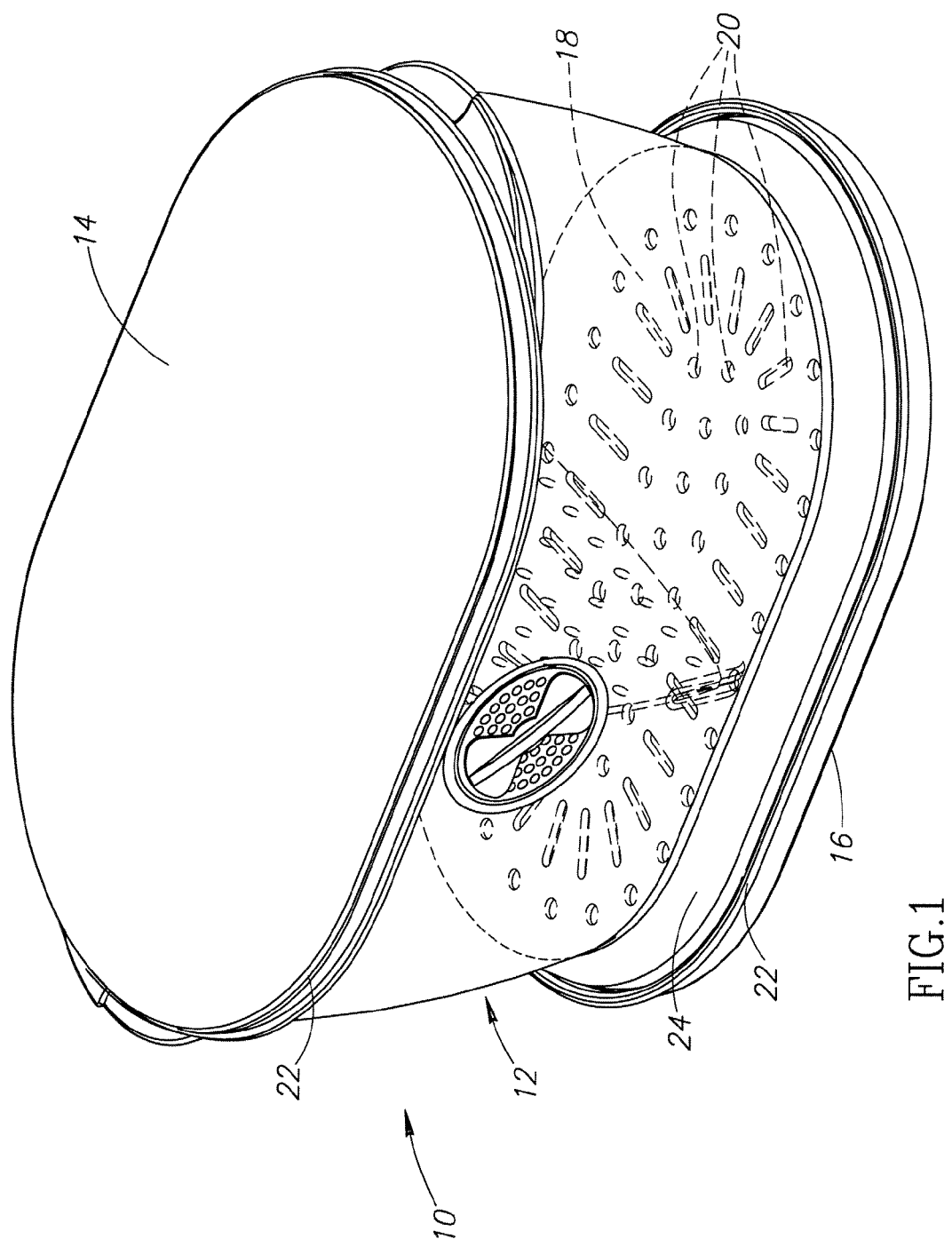
FIG. 1 is a perspective view of a produce storage container in accordance with an embodiment of the present invention.

Referring to FIG. 1, a container 10 according to one embodiment of the invention includes a vessel 12 sized to store a quantity of produce, an upper lid 14 and a lower lid 16. The vessel 12 is preferably transparent to permit viewing of its contents, but need not be transparent within the scope of the invention. A floor 18 of the vessel 12 has one or more passages 20 such as slots or holes formed therein to permit fluid to pass through the floor 18. The lower lid 16 is securable under the floor 18 to retain fluid passing through the passages 20.

In use, produce is placed in the vessel 12 without the upper and lower lid 14, 16 in place. In this form, the vessel acts as a colander or strainer for the produce. The produce is then rinsed with the rinsing water passing through the passages 20 and out of the vessel. If the produce is to be stored, preferably both the upper and lower lids are placed on the vessel 12. Alternatively, only the lower lid 14 is replaced to prevent leakage of remnants of the rinse water when the container 10 is placed on a countertop, table, or in the refrigerator.

The lower and upper lid secure to the vessel 12 by means of a friction fit. For example, the upper and lower lids 14, 16 may each have a rim 22 sized to elastically deform when fitted over the top and bottom, respectively, of the vessel 12 such that the restoring force maintains the lids 14, 16 secured to the vessel 12 and creates a substantial seal between the lids 14, 18 and the vessel 12. One or both of the lids may also employ flange-and-groove, snap-fit, suction, or other mechanisms for securing the lid in a water-tight manner.

The vessel 12 may include a base 24 interposed between the floor 18 and the lower lid 18. The base 24 may serve to define a volume between the floor 18 and the lower lid 16 into which water or other fluid may drain through the passages 20 when the lower lid 16 is in place, rather than remaining in contact with produce stored within the vessel 12. In the illustrated embodiment, the base 24 is a lip extending downwardly and outwardly from the floor 18. The lid 16 secures to the base 24 and forms a substantial seal with the base 24.

Figure 2:
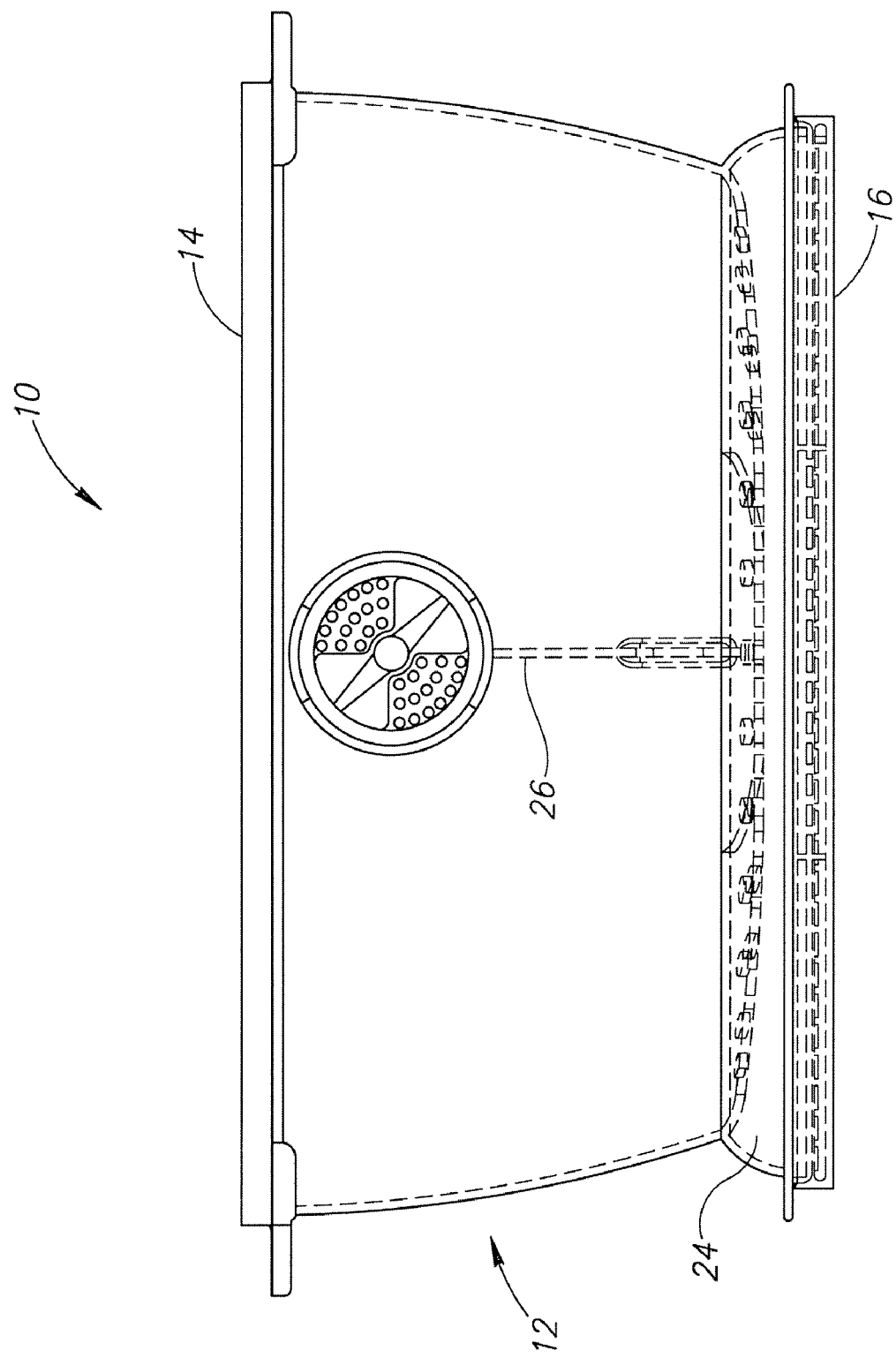
FIG. 2 is a side elevation view of the produce storage container in accordance with an embodiment of the present invention.
Figure 3:
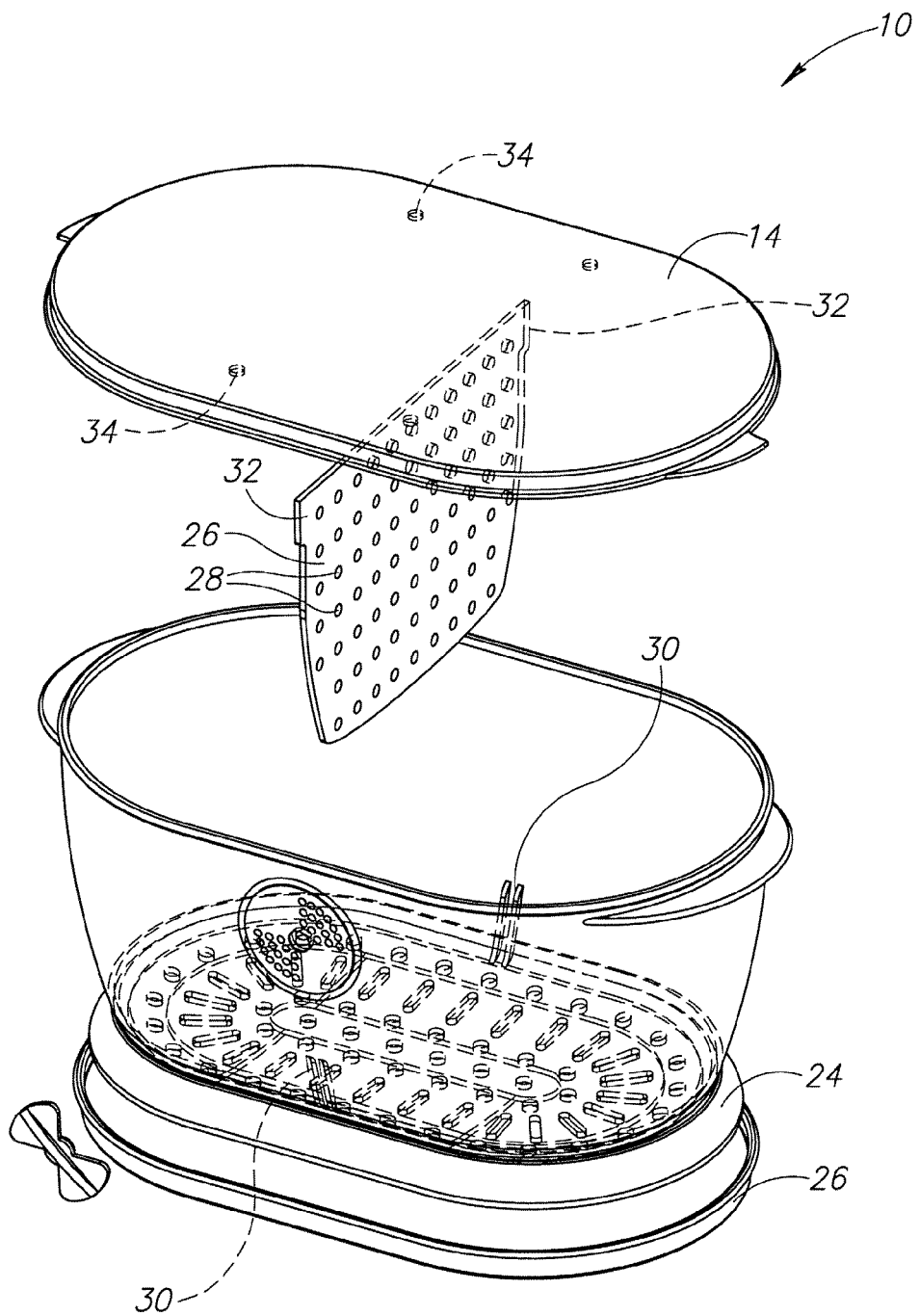
FIG. 3 is an exploded view of the produce storage container in accordance with an embodiment of the present invention.

Referring to FIGS. 2 and 3, a divider 26 may be placed within the vessel 12 to create separate compartments such that different types of produce may be stored separately. The divider 26 may include a number of holes or passages 28 to enable air flow between the compartments. The vessel 12 includes one or more channels or receptacles 30 within the wall of the vessel that are sized to receive the divider 26 and maintain the divider 26 in an upright orientation. In the illustrated embodiment, the receptacles 30 are embodied as slots or grooves engaging the edges of the divider 26. The divider 26 may include ears 32 engaging the walls of the vessel 12. The ears 32 and engagement of the divider 26 with the receptacles 30 may serve to stably hold the divider 26 in place.

Figure 4:
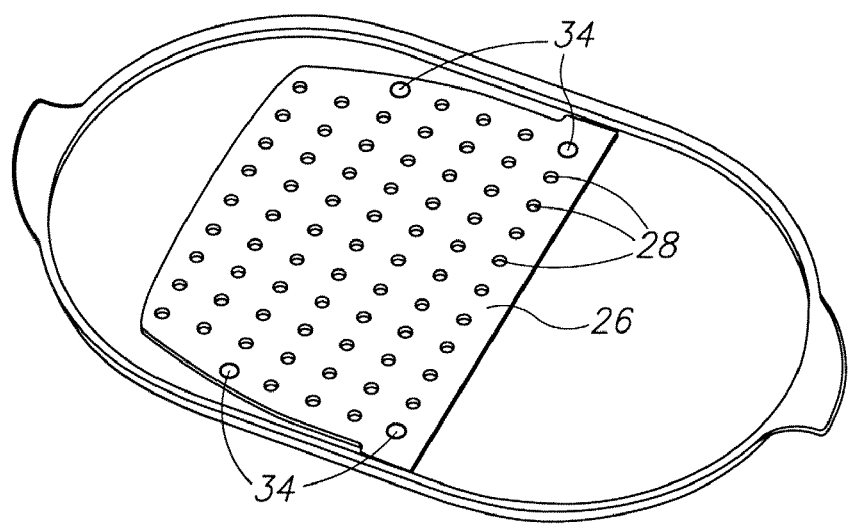
FIG. 4 is a perspective view of a lid for use with the produce storage container in accordance with an embodiment of the present invention.

Referring to FIG. 4, in one embodiment, the upper lid 14, lower lid 16, or both, includes one or more posts 34 sized and positioned to insert within one or more mating holes 28 on the divider 26. When the divider 26 is not needed the divider 26 can be positioned over the posts 34 such that the divider 26 will be held in place adjacent the lid and readily available when needed. The posts 34 may include a detent mechanism, such as a slight enlargement or lip near the distal end in order to resist removal of the divider 26 from the lid 14.

Figure 5:
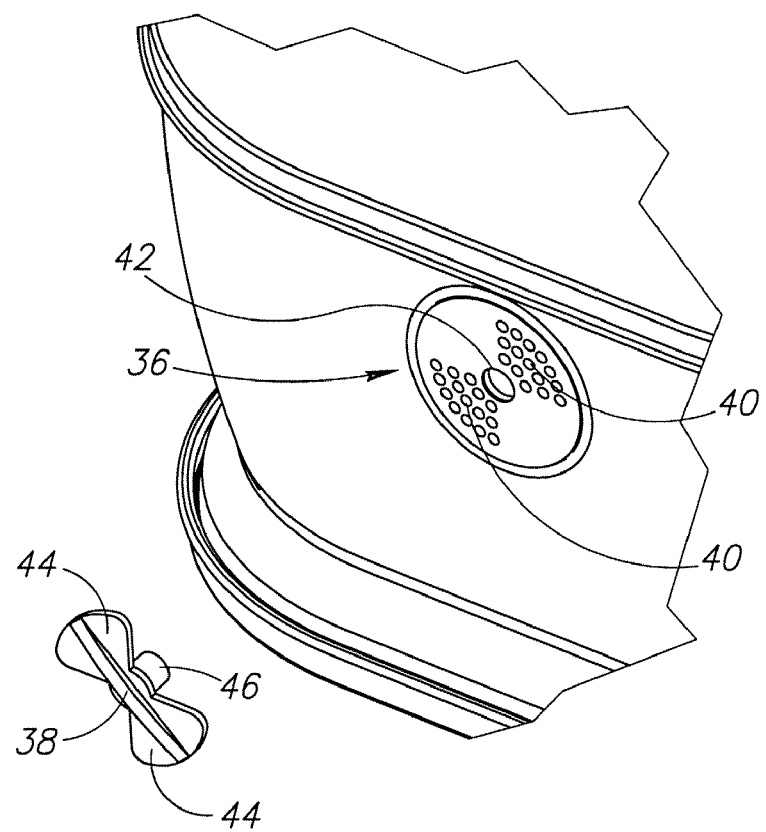
FIG. 5 is a partial perspective view of a vent and cover in accordance with an embodiment of the present invention.

Referring to FIG. 5, a vent 36 may be formed in the vessel 12 to permit airflow. A cover 38 may secure to the vessel 12 in order to completely or partially cover the vent 36. In the illustrated embodiment, the vent 36 includes two perforated areas 40 formed within a sidewall of the vessel and shaped as two segments of a circle; as shown, each perforated segment is approximately a quarter of the circle. An aperture 42 is provided at the center of the circle. A vent cover 38 is formed as two flanges 44 corresponding in size and position to the perforated areas 40. The vent cover 38 secures within the aperture 42, for example using a post 46 engaging the aperture 42 by means of a press fit or snap-on connection. When the cover 38 is positioned within the aperture 42, the flanges 44 are rotatable to selectively cover, uncover, or partially cover the perforated areas 40. The perforated areas may be located on either side of the location of the divider 26 such that both compartments of the vessel 12 are ventilated. Alternatively, a separate vent 36 and cover 38 may be provided for each compartment.

While the preferred embodiment of the invention has been illustrated and described, as noted above, many changes can be made without departing from the spirit and scope of the invention. Accordingly, the scope of the invention is not limited by the disclosure of the preferred embodiment.

I claim:

1. A food storage device, comprising:
   a vessel having a floor, a sidewall extending upwardly from a perimeter of the floor, the sidewall forming an interior space and terminating at an upper rim, the floor having a plurality of holes formed therein to allow the passage of water through the floor, the floor further having a central region that is bowed downwardly in a direction away from the upper rim;
   a base secured to the vessel and extending downwardly and outwardly from the perimeter of the floor to form a wide skirt having interior skirt sidewalls extending laterally beyond the perimeter of the floor, the base terminating in a lip and having an opening to allow the passage of water from the floor through the opening, and
   a lower lid removably secured to the base wherein a volume is defined between the base, the floor, and the lower lid, the lower lid forming a water-tight seal to retain the water passing through the plurality of holes.

2. The food storage device of claim 1, further comprising an upper lid, the upper lid removably secured to the upper rim of the vessel to form an airtight seal.

3. The food storage device of claim 2, further comprising a central divider positioned within the interior space, the central divider separating the interior space into two separated spaces.

4. The food storage device of claim 3, wherein the central divider further comprises a plurality of through-holes formed therein.

5. The food storage device of claim 3, wherein the central divider is removable.

6. The food storage device of claim 5, wherein at least one of the upper lid or the lower lid further comprises a means for removably retaining the central divider.

7. The food storage device of claim 5, wherein the upper lid further comprises at least one post, the at least one post being sized and positioned to be received by at least one of the plurality of through-holes formed on the central divider to retain the central divider adjacent the upper lid in a nested position for storage.

8. The food storage device of claim 1, further comprising a vent formed in the sidewall, the vent allowing the passage of air into and out of the interior space.

9. The food storage device of claim 8, further comprising a vent cover, the vent cover being positioned to selectively cover the vent to prevent the passage of air into and out of the interior space.

10. The food storage device of claim 1, wherein the sidewall is devoid of holes.

11. The food storage device of claim 3, further comprising a pair of slots formed on opposing interior surfaces of the sidewall, the pair of slots receiving the divider to retain the divider in position within the interior space.

12. The food storage device of claim 11, further comprising a vent selectively configurable to allow air to flow from outside the vessel into the interior space, the vent having a first passage formed within the sidewall for allowing air to flow into a first one of the two separate spaces and a second passage formed within the sidewall for allowing air to flow into a second one of the two separate spaces.

13. The food storage device of claim 12, further comprising a vent cover, the vent cover configured to selectively cover and uncover the first passage and the second passage.

14. The food storage device of claim 4, wherein the central divider is removable, the upper lid further comprising at least one peg sized and configured to be received within at least one of the plurality of through-holes to removably secure the central divider to the upper lid.

* * * * *